US008826187B2

(12) United States Patent
Willis

(10) Patent No.: US 8,826,187 B2
(45) Date of Patent: Sep. 2, 2014

(54) METHOD AND SYSTEM FOR MOVING A CURSOR AND SELECTING OBJECTS ON A TOUCHSCREEN USING A FINGER POINTER

(75) Inventor: Richard Willis, Victoria (AU)

(73) Assignee: Google Inc., Mountain View, CA (US)

(*) Notice: Subject to any disclaimer, the term of this patent is extended or adjusted under 35 U.S.C. 154(b) by 847 days.

(21) Appl. No.: 12/339,369

(22) Filed: Dec. 19, 2008

(65) Prior Publication Data

US 2009/0288043 A1    Nov. 19, 2009

Related U.S. Application Data

(60) Provisional application No. 61/015,575, filed on Dec. 20, 2007.

(51) Int. Cl.
*G06F 3/048* (2013.01)
*G06F 3/0481* (2013.01)
*G06F 3/0482* (2013.01)
*G06F 3/038* (2013.01)

(52) U.S. Cl.
CPC .............. *G06F 3/048* (2013.01); *G06F 3/0481* (2013.01); *G06F 3/0482* (2013.01); *G06F 3/038* (2013.01)
USPC ........................................................ 715/859

(58) Field of Classification Search
CPC ... G06F 3/0488; G06F 3/0481; G06F 3/0482; G06F 3/038
USPC .................................................. 715/776, 859
See application file for complete search history.

(56) References Cited

U.S. PATENT DOCUMENTS 6,278,443 B1 *   8/2001   Amro et al. ................... 345/173
6,664,990 B1 *  12/2003   Bates et al. ................... 715/857

(Continued)

FOREIGN PATENT DOCUMENTS

EP    0795811 A1    9/1997
EP    0813140 A1   12/1997

(Continued)

OTHER PUBLICATIONS

International Search Report from PCT/EP2008/067754, mailed Mar. 26, 2009 (3 pgs.).

(Continued)

*Primary Examiner* — Omar Abdul-Ali
*Assistant Examiner* — Anil Bhargava
(74) *Attorney, Agent, or Firm* — Shumaker & Sieffert, P.A.

(57) ABSTRACT

A finger pointer is used for moving a cursor and selecting objects on a touchscreen. The finger pointer includes a cursor indicator and a finger contact area. The cursor indicator points to a location on the touchscreen that would be activated when the finger pointer is selected. The finger contact area indicates the location on the touchscreen where a user may touch the screen to activate or move the finger pointer. The finger pointer may be used to select objects such as hyperlinks on a browser web page, and items from an application of menu. The user touches the touchscreen within the finger contact area. The user then contacts the touchscreen at a different location to move the finger pointer to the different location such that the cursor indicator is positioned on an object is to be selected.

16 Claims, 5 Drawing Sheets

(56) References Cited

U.S. PATENT DOCUMENTS

| | | |
|---|---|---|
| 2002/0171689 A1* | 11/2002 | Fox et al. .................... 345/860 |
| 2002/0191029 A1* | 12/2002 | Gillespie et al. ............. 345/810 |
| 2003/0146905 A1* | 8/2003 | Pihlaja ........................ 345/173 |
| 2003/0236109 A1* | 12/2003 | Nagata ...................... 455/575.1 |
| 2006/0033721 A1* | 2/2006 | Woolley et al. ............... 345/173 |
| 2006/0132460 A1* | 6/2006 | Kolmykov-Zotov et al. . 345/173 |
| 2006/0244735 A1* | 11/2006 | Wilson ........................ 345/173 |
| 2007/0150830 A1* | 6/2007 | Ording et al. ................ 715/784 |
| 2008/0094356 A1* | 4/2008 | Ording et al. ................ 345/157 |
| 2008/0128182 A1* | 6/2008 | Westerman et al. ....... 178/18.06 |
| 2008/0259040 A1* | 10/2008 | Ording et al. ................ 345/173 |
| 2009/0002326 A1* | 1/2009 | Pihlaja ........................ 345/173 |
| 2009/0027421 A1* | 1/2009 | Servan-Schreiber et al. . 345/661 |

FOREIGN PATENT DOCUMENTS

| | | |
|---|---|---|
| EP | 0 919 907 A1 | 6/1999 |
| JP | 10283115 A1 | 10/1998 |
| WO | 03054681 A1 | 7/2003 |

OTHER PUBLICATIONS

Written Opinion of the International Searching Authority from PCT/EP2008/067754, mailed Mar. 26, 2009 (5 pgs.).

Office Action from European Application No. 08 864 360.6, dated Oct. 6, 2011, 9 pp.

Response to Office Action dated Oct. 6, 2011, from European Application No. 08 864 360.6, filed Apr. 4, 2012, 11 pp.

* cited by examiner

METHOD AND SYSTEM FOR MOVING A CURSOR AND SELECTING OBJECTS ON A TOUCHSCREEN USING A FINGER POINTER

TECHNICAL FIELD

The present invention relates to a touchscreen cursor which is operated by a finger, and more particularly to moving a cursor and selecting objects on a touchscreen using a finger pointer.

BACKGROUND

When using a software application such as a browser, the layout of the page is not designed for use with a touchscreen. Web pages are designed for personal computers using a mouse input. Using a touchscreen with a stylus pointer works well because the tip of the pointer is small. The small tip of the stylus pointer allows a user to select the desired object, even when objects are close together.

However, using a finger to select an object presents unique challenges, especially when objects are close together. Because a finger is large relative to a touchscreen, the user cannot see a desired object located under his finger. Secondly, if objects are positioned on the touchscreen close together, the large contact area of the finger makes it difficult to determine which object is being selected.

Other approaches for implementing finger selection of objects on a touchscreen include enlarging the area of the screen where the finger is touching. However, this requires an application rewrite. Furthermore, while the zoom is active, another area of the page that was previously visible will no longer be visible. This degrades the user experience.

Therefore, what is needed is an improved method for moving a cursor and selecting objects on a touchscreen using a finger.

SUMMARY

Embodiments of the present invention provide a system and method for moving a cursor and selecting objects on a touchscreen using a finger pointer. The finger pointer includes a cursor indicator and a finger contact area. The cursor indicator points to a location on the touchscreen that would be activated when the finger pointer is selected. The cursor indicator can point to a small area on the screen with great accuracy. The finger contact area indicates the location on the touchscreen where a user may touch the screen to activate or move the finger pointer. The shape of the finger pointer is intuitive such that a user would know to touch the finger contact area to activate the finger pointer.

The finger pointer may be used to select objects such as hyperlinks on a browser web page, and items from an application or menu. The user touches the touchscreen within the finger contact area. The user then moves the finger pointer to a new location on the touchscreen. The user may move the finger pointer to the new location by sliding his finger to the new location or contacting the touchscreen at the new location. At the new location, the cursor indicator may be positioned on an object to be selected.

The finger pointer in accordance with embodiments of the present invention requires no change to any application that already supports a stylus touchscreen.

Furthermore, additional features may be easily implemented in a finger pointer system in accordance with embodiments of the present invention. For example, an inactive finger pointer may be displayed with a faded appearance. The finger pointer may be displayed with selectable menu buttons such as "forward" and "back" buttons to reaccess web pages or zoom buttons to increase or decrease the size of a page. Page scrolling may be easily activated by positioning the finger pointer near an edge of a page. A page that includes an object near an edge of the page may be scrolled slightly to facilitate object selection using the finger pointer.

In accordance with embodiments of the present invention, a method for moving a cursor and selecting objects on a touchscreen using a finger pointer includes displaying a finger pointer on a touchscreen at a first location. The finger pointer includes a cursor indicator and a finger contact area. An activation signal is received from the touchscreen. The activation signal is generated in response to a finger touching the touchscreen in the finger contact area of the finger pointer. A movement signal is received. The movement signal is generated in response to the finger contacting a surface of the touchscreen at a second location. The finger pointer is displayed on the touch screen at the second location. An object selection signal is received from the touch screen at the second location. The object selection signal is generated in response to the user activating the finger pointer to select an object indicated by the cursor indicator. The selected object is then activated.

These and other advantages of the invention will be apparent to those of ordinary skill in the art by reference to the following detailed description and the accompanying drawings.

DETAILED DESCRIPTION

Embodiments of the present invention provide a system and method for moving a cursor and selecting objects on a touchscreen using a finger pointer. The finger pointer includes a cursor indicator and a finger contact area. The cursor indicator points to a location on the touchscreen that would be activated when the finger pointer is selected. The cursor indicator can point to a small area on the screen with great accuracy. The finger contact area indicates the location on the touchscreen where a user may touch the screen to activate or move the finger pointer. The shape of the finger pointer is intuitive such that a user would know to touch the finger contact area to activate the finger pointer. The finger pointer may be used to select objects such as hyperlinks on a browser web page, and items from an application or menu. The user touches the touchscreen within the finger contact area. The user then uses his finger to move the finger pointer to a location where the cursor indicator is positioned on an object is to be selected. The finger pointer in accordance with embodiments of the present invention requires no change to any application that already supports a stylus touchscreen.

Thus, features related to scrolling, zooming, and reaccessing web pages may be easily implemented.

Figure 1:
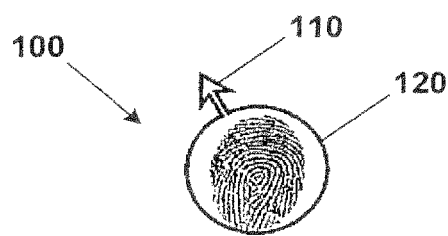
FIG. 1 illustrates a finger pointer for moving a cursor on a touchscreen.

FIG. 1 illustrates a finger pointer for moving a cursor on a touchscreen. The finger pointer 100 includes a cursor indicator 110 and a finger contact area 120. The cursor indicator 110 indicates to a user the location on a touchscreen where the cursor is active. As shown in FIG. 1, the cursor indicator is arrow-shaped such that the tip of the arrow indicates to a user the location on the touchscreen that would be activated by the cursor when the finger pointer 100 is selected. The finger contact area 120 indicates the location on the touchscreen where the user may touch the screen to activate or move the finger pointer 100. The finger contact area 120 is circular and sized to accommodate a fingertip.

The finger pointer 100 may be used to select objects such as hyperlinks on a browser web page, and items from an application or menu. The user touches the touchscreen within the finger contact area 120. In one embodiment, the user slides his finger across the touchscreen to move the finger pointer 100 to a location where the cursor indicator 110 is positioned on an object is to be selected. In another embodiment, the user contacts the touchscreen with his finger at a new location without sliding across the touchscreen surface such that the finger pointer 100 moves to the new location and the cursor indicator 110 is positioned on an object is to be selected.

The shape of the finger pointer 100 is intuitive such that a user would know to touch the finger contact area 120 to activate the finger pointer 100. Furthermore, when the finger pointer 100 is used with a mobile device such as a personal digital assistant (PDA) or cell phone, single handed operation of the mobile device is facilitated. A user may hold the mobile device in one hand and using the thumb of the same hand the finger pointer may be moved around the touchscreen and objects may be selected.

Figure 2:
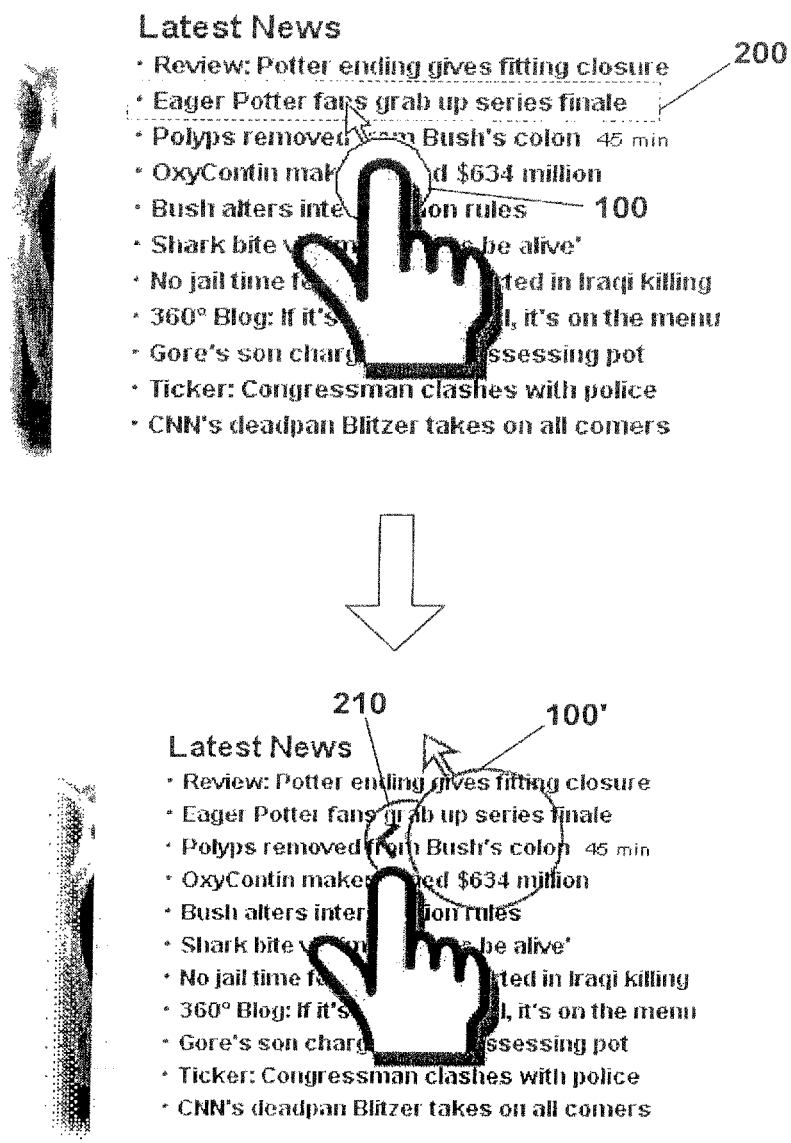
FIG. 2 illustrates a finger pointer for selecting objects on a touchscreen.

FIG. 2 illustrates a finger pointer for selecting objects on a touchscreen. As shown in FIG. 2, the objects may be hyperlinks on a web page. The user touches the screen within the finger contact area 120 and slides his finger across the touchscreen or otherwise enables movement of the finger pointer 100 to a new location. The tip of the cursor indicator 110 can point to a small area on the screen with great accuracy. In one embodiment, the finger pointer is "attracted" to selectable objects. Thus, even if the user is slightly inaccurate when positioning the finger pointer 100 to select an object, the finger pointer 100 will automatically move to a nearest selectable object.

When the cursor indicator 110 is positioned on an object that the user wants to select or activate (e.g., hyperlink 200), the user removes his finger from the finger contact area 120. In one embodiment, the user quickly taps the finger pointer 100 after removing his finger from the finger contact area 120. The tap causes the hyperlink 200 to be selected and the browser navigates to the page corresponding to the hyperlink 200. In another embodiment, the removal of the finger from the finger contact area 120 causes the object to be selected. This latter concept may be used when selecting items from a menu, since there is little doubt as to user intent.

In one embodiment, when the finger pointer 100 is released (i.e., when the user removes his finger from the finger contact area 120), the appearance of the finger pointer 100 fades to allow the page content to show through as indicated by inactive finger pointer 100'. In another embodiment, when the finger pointer 100 is released, the inactive finger pointer 100' is provided with a "back" button 210. The user may select the back button 210 to return to a previously accessed web page.

In accordance with the prior art, enlarging an area of a screen to facilitate selecting items directly with a finger requires significant changes to existing applications. The finger pointer in accordance with embodiments of the present invention requires no change to any application that already supports a stylus touchscreen.

The finger pointer 100 may be positioned on the touchscreen such that a page begins to scroll. Scroll direction depends on the position of the finger pointer 100 relative to a center of the touchscreen. Positioning the finger pointer in the center of the right edge of the screen will scroll the page horizontally left. Positioning the finger pointer ¾ of the way down the right edge of the screen will scroll the page horizontally left with a small amount of upward scrolling. Positioning the finger pointer 100 in the bottom right corner will scroll the page an equal amount to the left and upward.

Scroll speed is determined by the position of the finger pointer 100 relative to an edge of the touchscreen. When the finger pointer 100 is positioned near an edge of the touchscreen, the current page will start scrolling. Scroll speed increases when the finger pointer 100 is positioned closer to the edge of the touchscreen. Moving the finger pointer 100 away from the edge of the touchscreen reduces the scroll speed, until the finger pointer 100 is positioned far enough away from the edge to stop scrolling.

Figure 3:
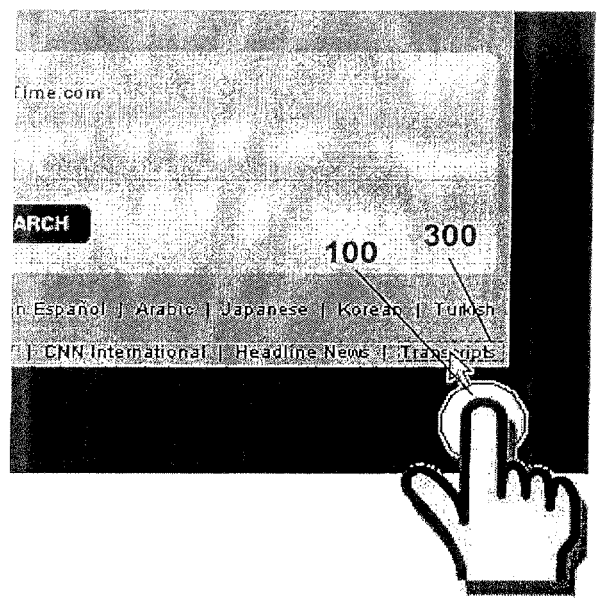
FIG. 3 illustrates a finger pointer for selecting objects at an edge of a touchscreen.

FIG. 3 illustrates a finger cursor for selecting objects at an edge of a touchscreen. As shown in FIG. 3, an object (e.g., hyperlink 300) may be positioned along a lower or right edge of a page such that the cursor indicator 110 of the finger pointer 100 cannot be positioned over an object to be selected. In accordance with an embodiment of the invention, to allow the finger pointer 100 to select objects on the bottom or right edge of a page, the page is scrolled past the bottom and the right edge such that the cursor indicator 110 may be positioned over the hyperlink 300.

Figure 4:
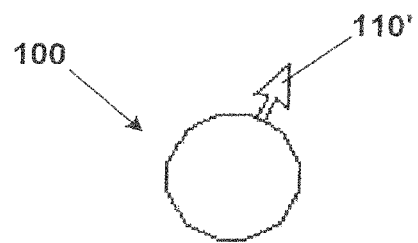
FIG. 4 illustrates a finger pointer designed for use with a finger of a left handed user.

FIG. 4 illustrates a finger pointer designed for use with a finger of a left handed user. As shown in FIG. 4, a cursor indicator 110' is positioned on an upper right portion of the finger pointer 100, such that the left handed user's finger does not block the user's view when activating the finger pointer 100.

Figure 5:
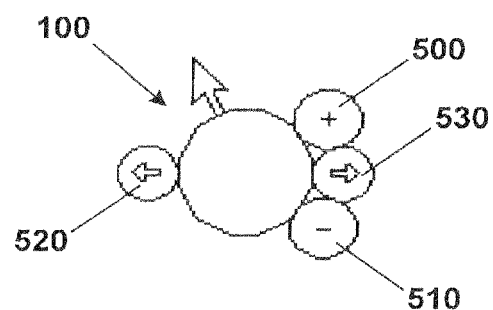
FIG. 5 illustrates a finger pointer that includes selectable menu keys for zooming and re-accessing web pages.

FIG. 5 illustrates a finger pointer that includes selectable menu keys for zooming and re-accessing web pages. In accordance with embodiments of the present invention, the finger pointer 100 incorporates selectable buttons to activate available features. As shown in FIG. 5, the finger pointer 100 includes touch keys for zooming 500, 510 and "forward" and "back" buttons 520, 530 for re-accessing web pages.

Figure 6:
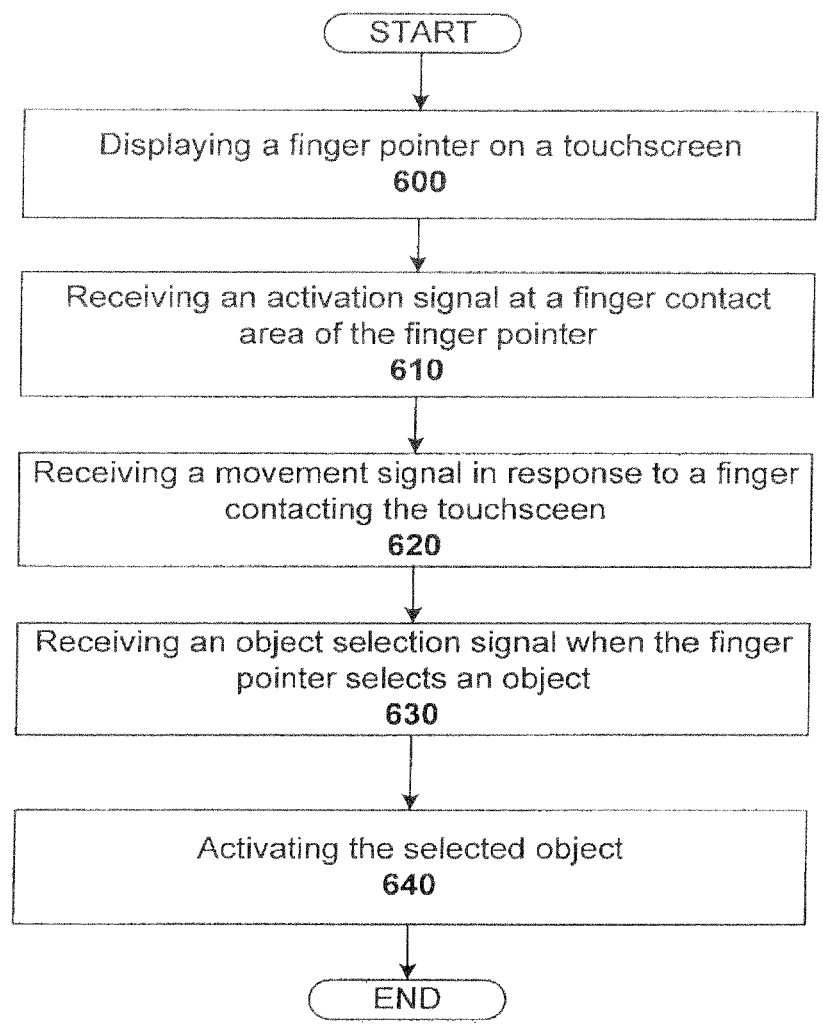
FIG. 6 is a flow diagram illustrating a method for moving a cursor and selecting objects on a touchscreen using a finger pointer.

FIG. 6 is a flow diagram illustrating a method for moving a cursor and selecting objects on a touchscreen using a finger pointer. A finger pointer is displayed on a touchscreen (step 600). The finger pointer includes a cursor indicator and a finger contact area. The cursor indicator points to a location on the touchscreen that would be activated when the finger pointer is selected. The finger contact area indicates the location on the touchscreen where a user may touch the screen to activate or move the finger pointer.

An activation signal is received from the finger contact area of the finger pointer (step 610). The activation signal is generated in response to a user placing his finger on the touchscreen in the finger contact area of the finger pointer. In one embodiment, the appearance of the finger pointer changes in response to receiving the activation signal. For example, the finger pointer may change from a faded appearance to a move vibrant appearance to indicate activation of the finger pointer.

A movement signal is received in response to a finger contacting the touchscreen at a different location (step 620). In one embodiment, the user slides his finger from one location on the touchscreen to a new location. The touchscreen detects the movement of the user's finger as it slides across the touchscreen such that the finger pointer is displayed at the new location. In another embodiment, the user contacts the touchscreen at the new location (without sliding) and the finger pointer is displayed at the new location.

An object selection signal is received when the finger pointer selects an object (step 630). The object may be a hyperlink or an item from an application or a menu. When the cursor indicator is positioned on an object that the user wants to select, the user removes his finger from the finger contact area and quickly taps the finger contact area to select the object and generate the object selection signal. Alternatively, the object selection signal is generated when is selected the user removes his finger from the finger contact area without requiring any additional tapping.

The selected object is then activated (step 640). If the object is a hyperlink, activation of the object causes the browser to navigate to the page corresponding to the hyperlink. If the object is a menu item, activation of the object causes the menu item to be selected and additional processing is performed in accordance with the selected menu item.

As is apparent from the above description, embodiments of the present invention provide a finger pointer for moving a cursor and selecting objects on a touchscreen. The shape of the finger pointer is intuitive such that a user would know to touch the finger contact area to activate the finger pointer. The finger pointer facilitates single hand operation of mobile devices. The cursor indicator can point to a small area on the screen with great accuracy. The finger pointer in accordance with embodiments of the present invention requires no change to any application that already supports a stylus touchscreen. Thus, features related to scrolling, zooming and re-accessing pages may be easily implemented.

The present invention has been described in terms of specific embodiments. As will be understood by those skilled in the art, the embodiments illustrated above may be modified, altered, and changed without departing from the scope of the present invention. The scope of the present invention is defined by the appended claims.

The invention claimed is:

1. A method for moving a cursor and selecting objects, the method comprising:
outputting a finger pointer for display at a first location of a touchscreen, wherein the finger pointer comprises a cursor indicator coupled to a finger contact area;
receiving an activation signal from the touchscreen, wherein the activation signal is generated in response to detecting a contact at the touchscreen in the finger contact area;
receiving a movement signal, wherein the movement signal is generated in response to detecting a movement from the first location to a second location of the touchscreen that is substantially at an edge of the touchscreen;
responsive to receiving the movement signal;
outputting the finger pointer for display at the second location of the touchscreen;
outputting, for display, a visual scrolling of a page away from the edge of the touchscreen and beyond an edge of the page, wherein the visual scrolling enables at least a portion of the finger contact area to be displayed at the touchscreen in an area that is beyond the edge of the page and substantially between the edge of the touchscreen and the edge of the page, such that the cursor indicator coupled to the finger contact area indicates an object in the page that is positioned substantially at the edge of the page;
receiving an object selection signal from the touchscreen at the second location, wherein the object selection signal is generated in response to activation of the finger pointer to select the object indicated by the cursor indicator; and
activating the object.

2. The method of claim 1, wherein the cursor indicator protrudes from the finger contact area such that the tip of the cursor indicator indicates to a user a location on the touchscreen that would be activated by the cursor indicator if the finger pointer is selected.

3. The method of claim 2, wherein the cursor indicator is arrow-shaped.

4. The method of claim 1, wherein the movement signal is generated in response to detecting continuous contact at the touchscreen that moves from the first location to the second location.

5. The method of claim 1, wherein the movement signal is generated in response to detecting cessation of the contact at the first location and then detecting the contact at the second location without detecting continuous contact that moves from the first location to the second location.

6. The method of claim 1, wherein the activation of the finger pointer is generated in response to detecting the contact at the touchscreen in the finger contact area after detecting a cessation of the contact at the touchscreen in the finger contact area.

7. The method of claim 1, wherein the activation of the finger pointer is generated in response to detecting a cessation of the contact at the touchscreen in the finger contact area.

8. The method of claim 1, wherein an appearance of the finger pointer fades to allow content of the page to show through the finger pointer in response to detecting a cessation of the contact at the touchscreen in the finger contact area.

9. The method of claim 1, wherein an inactive finger pointer is provided with a back button in response to detecting a cessation of the contact at the touchscreen in the finger contact area.

10. The method of claim 1, wherein positioning the finger pointer at a distance from a center of the touchscreen starts scrolling the page displayed at the touchscreen.

11. The method of claim 10, wherein a direction of the scrolling depends on a position of the finger pointer relative to the center of the touchscreen.

12. The method of claim 10, wherein a speed of the scrolling is determined by a position of the finger pointer relative to the edge of the touchscreen.

13. The method of claim 1, wherein the finger pointer includes selectable menu keys for zooming and re-accessing web pages.

14. The method of claim 1, further comprising automatically moving the finger pointer to a nearest selectable object.

15. An electronic device, comprising:
at least one processor,
wherein the at least one processor is configured to:
output a finger pointer for display at a first location of a touchscreen, wherein the finger pointer comprises a cursor indicator coupled to a finger contact area
receive an activation signal from the touchscreen, wherein the activation signal is generated in response to detecting a contact at the touchscreen in the finger contact area;
receive a movement signal, wherein the movement signal is generated in response to detecting a movement from the first location to a second location of the touchscreen that is substantially at an edge of the touchscreen;

responsive to receiving the movement signal:
  output the finger pointer for display at the second location of the touchscreen; and
  output, for display, a visual scrolling of a page away from the edge of the touchscreen and beyond an edge of the page, wherein the visual scrolling enables at least a portion of the finger contact area to be displayed at the touchscreen in an area that is beyond the edge of the page and substantially between the edge of the touchscreen and the edge of the page, such that the cursor indicator coupled to the finger contact area indicates an object in the page that is positioned substantially at the edge of the page;
receive an object selection signal from the touchscreen at the second location, wherein the object selection signal is generated in response to activation of the finger pointer to select the object indicated by the cursor indicator; and
activate the object.

16. A non-transitory computer readable storage medium containing instructions that, when executed by at least one programmable processor, cause the at least one programmable processor to perform operations comprising:
  outputting a finger pointer for display at a first location of a touchscreen, wherein the finger pointer comprises a cursor indicator coupled to a finger contact area;
  receiving an activation signal from the touchscreen, wherein the activation signal is generated in response to detecting a contact at the touchscreen in the finger contact area;
  receiving a movement signal, wherein the movement signal is generated in response to detecting a movement from the first location to a second location of the touchscreen that is substantially at an edge of the touchscreen;
  responsive to receiving the movement signal:
    outputting the finger pointer for display at the second location of the touchscreen;
    outputting, for display, a visual scrolling of a page away from the edge of the touchscreen and beyond an edge of the page, wherein the visual scrolling enables at least a portion of the finger contact area to be displayed at the touchscreen in an area that is beyond the edge of the page and substantially between the edge of the touchscreen and the edge of the page, such that the cursor indicator coupled to the finger contact area indicates an object in the page that is positioned substantially at the edge of the page;
  receiving an object selection signal from the touchscreen at the second location, wherein the object selection signal is generated in response to activation of the finger pointer to select the object indicated by the cursor indicator; and
  activating the object.

* * * * *